April 8, 1958
J. M. O'DONNELL
2,830,036
PRODUCTION OF FERTILIZER COMPOSITIONS
Filed June 6, 1955
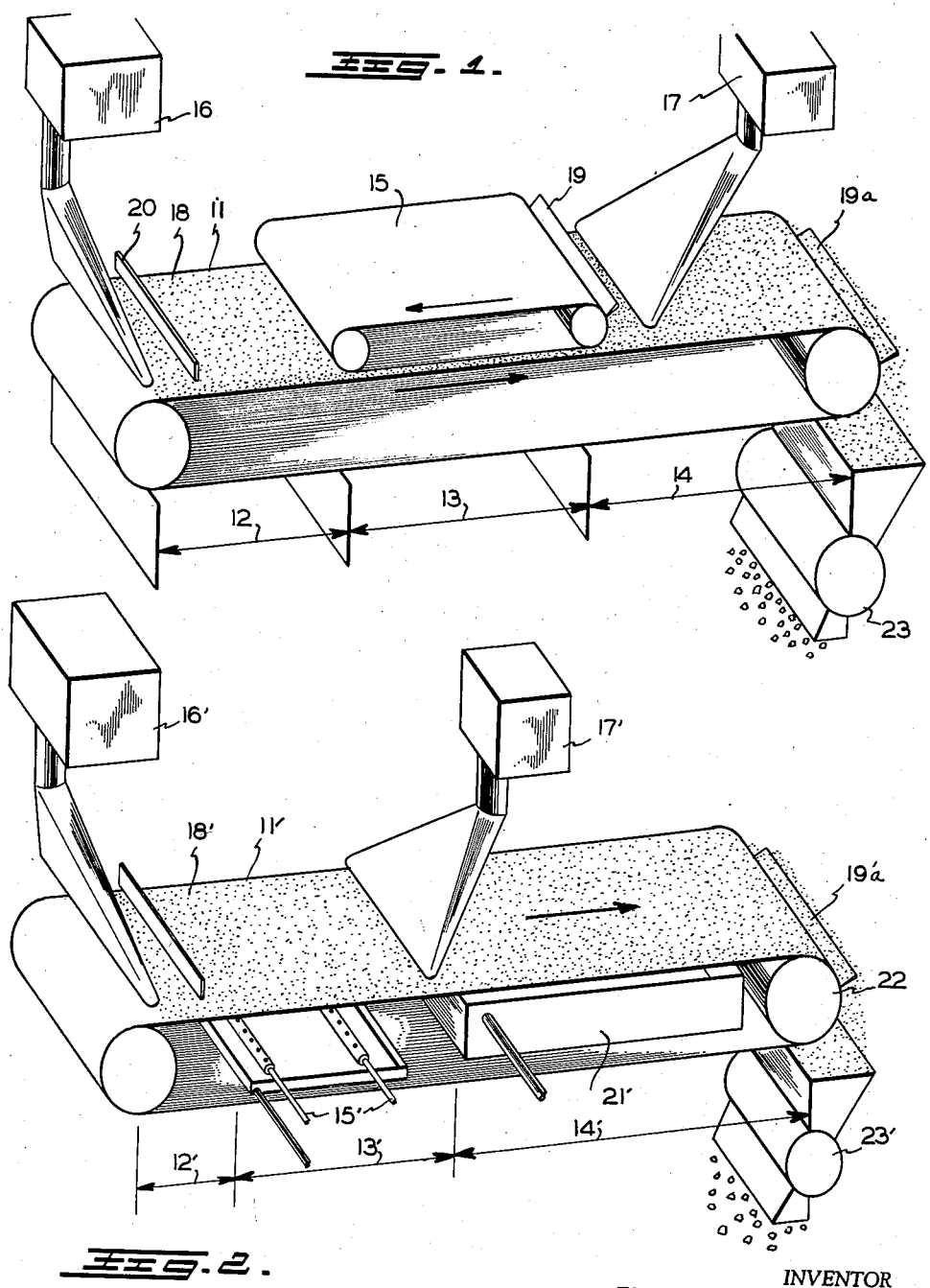
INVENTOR
JAMES M. O'DONNELL
BY *J. Harold Kilcoyne*
ATTORNEY

United States Patent Office 2,830,036
Patented Apr. 8, 1958

2,830,036

PRODUCTION OF FERTILIZER COMPOSITIONS

James M. O'Donnell, Woonsocket, R. I., assignor, by mesne assignments, to Nitro-Form Agricultural Chemical Company, Woonsocket, R. I., a corporation of Rhode Island Application June 6, 1955, Serial No. 513,379

9 Claims. (Cl. 260—69)

This invention relates to improvements in the production of fertilizer compositions and more specifically it is directed to an improved process for the production of solid urea-formaldehyde fertilizer compositions in which nitrogen is agronomically available for plant use.

Prior art

The urea-formaldehyde fertilizer compositions produced by the present process are well known in the art and are commonly known as urea-form products—"Urea-Form-New Nitrogen Fertilizer," Clark, K. G., Crops and Soils, vol. 4, No. 8 (1952). Such solid fertilizers are conventionally produced in an acid catalyzed polymerization reaction in which the liquid reactant mol ratio of urea/formaldehyde is >1 and generally has an optimum value of 1.2 to 1.5. It is thought that the predominance of the urea reactant in the optimum range is a factor influencing the utility of the products by suppression of cyclic and cross-linked polymers unusable for fertilizers. Also, the acid catalyst process generally distinguishes the urea-form fertilizers from the highly insoluble urea formaldehyde resins of the plastic field commonly found in resin scrap. The U. S. Patent 2,415,996, Rohner, and Canadian Patent 419,422, Keenan, describe typical urea-form fertilizer compositions.

A well recognized advantage of urea-formaldehyde or urea-form fertilizers (Nitroform) is that the insoluble plant food nitrogen bound up in the solid polymer becomes slowly available in soil as plant sustenance by the general reaction:

Urea→Ammonia→Nitrogen or Nitrates

The key characteristic of the slowly available nitrogen is expressed as the "availability index of cold water-insoluble nitrogen" and the currently accepted test is based upon the percentage of the cold water-insoluble nitrogen that dissolves in a hot aqueous phosphate solution "Urea-Formaldehyde Fertilizers," Kralovec, R. D., and Morgan, W. A., Agriculture and Food Chemistry, vol. 2, No. 2, pages 92–94 (1954); "Report of the Subcommittee Recommendations of the Referee—Nitrogen Activity Index," Smith, J. B.; J. A. O. A. C., vol. 38, No. 1, page 64 (1955). An availability index of 40% or greater for insoluble but slowly available nitrogen when calculated by the following formula is deemed satisfactory for urea-form products and serves to distinguish the urea-form fertilizer products from resin scrap whose availability index has been found to range from 2% to 10%. (Official publication A. A. F. C. O. No. 8 (1954), page 14 (N–o–16 urea formaldehyde fertilizer materials).

$$AI = \frac{(\text{percent } IN_{25} - HW_{IN}) \times 100}{\text{percent } IN_{25}}$$

Where

AI = availability index
$IN_{25}$ = cold water (25° C.±2° C.)—insoluble nitrogen
$HW_{IN}$ = hot-buffer insoluble nitrogen The more rapidly the nitrogen nitrifies, the higher the availability becomes. The buffer solution is a mixture of $KH_2PO_4$ and $K_2HPO_4$ phosphates.

Among the factors affecting the availability index (AI) which is a measure of the economic utility of solid urea-form fertilizer compositions are such processing variables as the urea-formaldehyde reactant mole ratio, the pH, the temperature and length of reaction time. In attempting to correlate these factors and develop processes for producing urea-form fertilizing compositions, U. S. Patent No. 2,592,809, Kralovec, describes a process for producing thin films of urea-form not exceeding ¼" in thickness on a revolving drum and U. S. Patent No. 2,644,806, Kise, describes a cyclic process using a filter wheel.

The effect generally of reaction temperature as affecting the final product has been discussed by Clark, K. G. et al. (Clark, H. G., Yee, J. Y., and Love, K. S., "New Synthetic Nitrogen Fertilizer" Industrial and Engineering Chemistry, vol. 40 No. 7, pages 1178–1183 (1948); Clark, K. G., et al. "Preparation and Properties of Urea-Form," Industrial and Engineering Chemistry, vol. 43, pages 871–875 (1951). However, the problems of specific three-stage temperature control after the initial induction mixing of the liquid reactant and of certain additive components to the basic urea-formaldehyde mix in the process procedure have not been approached in the art developed to date in the manner to be described.

Therefore, it is an object of this invention to provide an improved process for the production of solid urea-formaldehyde fertilizer compositions which comprises a continuous moving belt three-stage temperature control procedure.

It is a further object of this invention to provide, in a process for the production of urea-formaldehyde fertilizers, for the addition of a surface active agent to the reaction mix to facilitate the processing of fertilizer layers of thicknesses greater than ¼".

It is a further object of this invention to provide a novel continuous three-stage temperature control process for the production of urea-form fertilizer compositions.

Other objects of this invention will appear hereinafter.

The process of this invention has utility in providing a rapid, continuous and economical procedure for producing valuable solid fertilizer compositions.

According to this invention it has been found that superior solid urea-form fertilizer compositions may be obtained by continuously introducing acidic urea-formaldehyde reactants (U/F 1.2–1.5) with or without the addition of a surface active agent, onto a continuous elongated moving belt, which belt is divided into three separate temperature control stages. The applied temperature of the initial or reaction stage on the belt is within the range 60° C.–100° C. and preferably within the range 60° C.–90° C. The polymer mix moves quickly on the belt to the second or quick cooling stage of the process where the formed polymeric material is rapidly chilled by means of a cooling belt maintained at about 10° C. or by other equivalent means. Neutralization of the acid polymeric material is preferably achieved in this quick cooling stage. After a substantial time in the quick cooling stage exceeding the time elapsed in the initial stage, the continuous belt moves the layer of fertilizer polymer to the third or drying stage on the belt maintained at about 120° C. applied temperature where the material is dried and flaked off as urea-form fertilizer product and prepared in convenient form for shipment.

In outline form the process of the present invention may be summarized as follows:

REACTION STAGE (1) The introduction of the acidified urea-formaldehyde solution to a hot moving belt surface, the applied temperature being maintained between 60° C. to 100° C. at a rate which will develop a layer thickness of about ¼ to ½ of an inch.

QUICK COOLING STAGE (2) Immediately cooling the resulting polymer layer which is formed on the hot movable belt to a layer temperature of about 40° C.–50° C. as quickly as possible after the induction temperature is reached and the formation of the polymer has become substantial on the movable surface and spraying with a neutralizing solution to maintain a pH above 7.0 either during or shortly before or after this quick cooling stage of the process. The neutralizing step is preferably achieved when the layer temperature is 50° C. or less.

DRYING STAGE (3) The subsequent re-heating and drying of the product on the same movable belt surface from which it is subsequently scraped, granulated and prepared for shipment.

A clearer understanding of certain features of this invention may be had by reference to the figures in the drawing, which, however, are to be viewed merely as aids in explaining the process, and not in any sense as limitations thereof.

Figure 1 is a diagrammatic perspective view illustrating an apparatus for carrying out the present three-stage temperature control process; and Figure 2 is also a diagrammatic perspective of an alternative apparatus for carrying out the present process.

The process of the present invention is further illustrated by the following example and reference is directed to the drawing for key features of the process.

Example 1 (referring to Figure 1)

As a preliminary treatment, to 470 pounds of 37% commercial formaldehyde was added enough 6 N caustic to bring the pH to 9.50. The alkalinized formaldehyde was heated to a temperature of 60° C. and 510 pounds of urea were added to the mix. The negative heat of solution reduced the temperature of the mix to 30° C. The liquid mix solution was reheated to about 60° C. and maintained for 20 minutes before it was introduced to a proportioning pump and then to a mixing pump with enough 10% by volume sulphuric acid to bring the pH to 3.0. After the acidified urea-formaldehyde solution passed through the positive displacement mixing pump it was sprayed 16 onto a continuous stainless steel belt 11 whose first section 12 was heated at 90° C. applied temperature at a rate sufficient to form a layer thickness in the range ¼–½ inch. After the immediate formation of the polymer on the endless stainless steel belt, the material was moved to the second section 13 of the belt where the polymer layer 18 was sandwiched between the original belt 11 and cooling means 15 which here consisted of a cooling belt maintained at 10° C. The time elapsing between the introduction of the acidified urea-formaldehyde to the moving belt and cooling was 5 seconds. The chilling operation was continued for an additional 30 seconds for a sufficient time to reduce the temperature of the layer from about 60° C. (first section) to a range of about 40° C.–45° C. (second section). After cooling, the material came out of the sandwiching mechanism and was neutralized by use of a spraying device 17 with a 5% sodium carbonate solution at a rate sufficient to bring the pH to 8.0. The moving layer of polymer next passed to the third or drying section 14 as it continued on the moving endless belt 11 and was heated by applying a temperature of 120° C. for a subsequent drying. The drying operation was complete after a time of one minute had elapsed in the drying stage or third section 14. The material was then scraped (19a) from the movable belt and granulated (23). Scraper 19 and rubber dam 20 are incidental apparatus accessories to the process. The urea-form product was tested and gave an availability index (AI) of 60% as determined by the Kralovec-Morgan phosphate test for nitrogent activity (1954). The fertilizer product also demonstrated a moisture content of less than 5%.

Example 2 (referring to Figure 2)

In this example, using a modified apparatus for the three-stage temperature control urea-form process, the acidified urea-form (UF) stock solution was spread onto a continuous moving belt 11' maintained at 80° C. applied temperature and constituting the first or reaction section 12' of the belt. The stock solution was applied from container and spreading device 16'. The belt was then rapidly cooled by ice water (about 10° C.) cooling means 15' applied underneath the belt. The temperature of the moving layer of polymer 18' in this second section of the belt 13' was reduced to about 45° C. from a layer temperature of about 60° C. in the first section 12'. After a time lapse of about one minute in the second section 13', an alkaline neutralizing solution was applied to the moving layer 18' by means of container and dispenser 17'. Following this, the moving layer passed into the third section of the belt where heating means 21' consisting of strip heaters, steam coils or gas flame dried the polymer layer by applying heat at about 110° C. Additional heating means 22' consisting of a heated drum cylinder used to insure complete drying to a suitable maximum moisture content of 5% which was achieved for the product. The elapsed time in the third section was about two minutes. The urea-form product was then scraped off by scraper 19a and granulated at 23 for subsequent bagging operations. The product demonstrated an availability index of 55% calculated by the Kralovec-Morgan phosphate test for nitrogen activity (1954).

Example 3

The incorporation of a non ionic surface active agent of the ethylene oxide condensate type in the reaction mix of typical samples such as the illustrations in Examples 1 and 2, served to prevent agglomeration in the formed polymer layers where thicknesses approaching ½" were obtained. The surface active agent was incorporated in an amount of about 3 pounds per ton of reactant solution and specifically Igepal CO 650 (Antara Division, General Dyestuffs) and Wooncopal E. O. (Woonsocket Color and Chemical Co.), have been used.

Heretofore and hereinafter the terms "solid urea-formaldehyde fertilizer composition," "urea-form," "solid urea-formaldehyde polymer," and similar language are intended and defined to be acid catalyzed reaction products of urea and formaldehyde containing at least 35% nitrogen largely in insoluble but slowly available form. The water insoluble nitrogen in these products test not less than 40% active by the Kralovec-Morgan phosphate test (1954) and generally the nitrogen is agronomically available for plant use.

Furthermore, the terms "liquid mix" and similar language applied to the reactant mixture of urea and formaldehyde is intended to include true liquid mixture (dilute solution) as well as slurry concentrations achieved by the preliminary induction procedure (concentrated solution).

Having thus described this invention which includes such alterations, equivalents and substitutions as might be readily devised by a worker skilled in the art and is not to be limited except by the following language and meaning in the appended claims.

I claim:

1. In a method for preparing urea-form fertilizer compositions from an acidified aqueous liquid mix produced under alkaline conditions at a temperature not exceeding about 60° C. and containing 1.2 to 1.5 molecular equivalents of urea per molecular equivalent of formaldehyde, the steps comprising introducing the acidified aqueous liquid mix onto a horizontal elongated moving surface to form a polymer layer and subjecting said layer to a stagewise temperature control process comprising (a) initiating reaction by heating at an applied temperature of about 60° C. to 100° C., (b) quick cooling to produce a layer temperature of about 40° C. to 50° C., (c) neutralizing said layer, and (d) drying at an applied temperature of about 120° C.

2. The method of claim 1 wherein the liquid mix is introduced onto the moving surface in an amount sufficent to form a polymer layer on said surface of up to about ½ inch in thickness.

3. The method of claim 1 wherein the liquid mix is introduced onto the moving surface in an amount sufficient to form a polymer layer on said surface of about ¼ inch to ½ inch in thickness.

4. The method of claim 1 wherein a non-ionic phenol ethylene oxide surface active agent is added to the liquid mix prior to introducing said liquid mix onto the moving surface.

5. In a method of preparing solid urea-formaldehyde fertilizer compositions from an acidified aqueous liquid mix produced under alkaline conditions at a temperature not exceeding about 60° C. and containing 1.2 to 1.5 molecular equivalents of urea per molecular equivalent of formaldehyde, the steps comprising introducing the liquid mix onto a horizontal elongated moving surface to form a polymer layer and subjecting said layer to a stagewise temperature control process comprising (a) initiating reaction by heating at temperatures within the range about 60° C. to 100° C., (b) applying quick cooling temperatures of about 40° C. to 50° C., (c) neutralizing said layer, and (d) applying drying temperatures of about 100° C. to 130° C.

6. In the method of claim 5 wherein the (b) quick cooling temperatures are applied for a substantially longer period of time than the (a) initiating heating temperatures.

7. In the method of claim 5 wherein the polymer layer formed on the surface ranges in thickness up to about ½ inch.

8. In the method of claim 5 wherein the polymer layer formed on the surface ranges in thickness from about ¼ inch to ½ inch.

9. The method of claim 5 wherein a non-ionic phenol ethylene oxide surface active agent is added to the liquid mix prior to introducing said liquid mix onto the moving surface.

References Cited in the file of this patent

UNITED STATES PATENTS

| | | |
|---|---|---|
| 2,456,192 | Houlton | Dec. 14, 1948 |
| 2,592,809 | Kralovec et al. | Apr. 15, 1952 |

OTHER REFERENCES

"Commercial Fertilizer," March 1954, pages 29–30, 32, 35 and 38–40. "U. S. D. A. Fertilizer Technology Research Since 1950," Jacob.